Patented Aug. 26, 1947

2,426,472

UNITED STATES PATENT OFFICE 2,426,472

BOROSILICATE GLASSES

John E. Stanworth, Sheffield, England, assignor to General Electric Company, a corporation of New York No Drawing. Application January 9, 1947, Serial No. 721,143. In Great Britain January 28, 1946

5 Claims. (Cl. 106—54)

This invention relates to glass compositions possessing properties which render them suitable for many uses.

For most purposes, it is desirable that the glass compositions provided should be such that they can be melted with relative ease. Furthermore, it often is necessary for glass compositions to possess good electrical properties, such as high D. C. electrical resistivity and low A. C. power loss. Glasses possessing all these properties have hitherto generally included a relatively high percentage of lead oxide as one of their constituents. Glasses including lead oxide as a major constituent possess, however, certain disadvantages inasmuch as the lead oxide is readily reduced when the glass is worked in a flame, and if the batch is melted in a continuous tank furnace volatilization of the lead oxide may occur.

The object of the present invention is to provide a range of glasses which, while possessing most of the advantages associated with lead glass are yet free from lead and furthermore possess electrical properties which are even superior to those of lead glasses hitherto available.

The present invention comprises glasses falling within the following range of percentage composition by weight namely, silica 55–65; boric oxide 9–25; barium oxide 12.5–4; zinc oxide 7.5–2; calcium fluoride 5–0; sodium oxide and potassium oxide 15–5.

I have found that by varying the constituents of glasses falling within the range above mentioned it is possible to obtain a series of glasses having graded coefficients of thermal expansion. Thus by sealing successively to one another a series of glasses falling within the above mentioned range a thermal expansion characteristic of the composite glass member so produced varies progressively whereby one is enabled to obtain a satisfactory seal between a soda lime and borosilicate glass which is capable of withstanding considerable variation in temperature without detriment to the seal.

Thus according to a further feature of the invention I provide a series of glasses falling within the range above specified and possessing progressively diminishing coefficients of thermal expansion as the percentage of silica and boric oxide progressively increases and the percentages of the remaining constituents progressively decreases, the general characteristic of each of the glasses being maintained substantially uniform.

As examples of glass compositions with progressively differing thermal expansion characteristics within the above mentioned range I may give the following:

|  | $SiO_2$ | $B_2O_3$ | BaO | ZnO | $CaF_2$ | $Na_2O$ | $K_2O$ | Expansion coefficient (0–300) |
|---|---|---|---|---|---|---|---|---|
| Example I | 55.0 | 9.6 | 12.4 | 7.2 | 3.2 | 3.8 | 8.8 | 81.7 |
| Example II | 57.3 | 13.0 | 10.4 | 6.0 | 2.7 | 3.2 | 7.4 | 74.3 |
| Example III | 59.6 | 16.4 | 8.4 | 4.8 | 2.2 | 2.6 | 6.0 | 61.3 |
| Example IV | 61.9 | 19.8 | 6.4 | 3.6 | 1.7 | 2.0 | 4.6 | 49.7 |

All four glasses listed in the above table have excellent electrical properties, e. g. their D. C. resistivities at 300° C. and 200° C. are respectively $10^{9.8}$ and $10^{12.2}$. Example I in the above table will seal to common soda-lime glass such as one having the percentage composition by weight viz: $SiO_2$, 71.8; $Al_2O_3$, 1.5; CaO, 6.6; MgO, 3.0; $Na_2O$, 16.7; $K_2O$, 0.4.

Each of the above glasses seals readily to its neighbour and finally the last glass in the table will seal readily to a low expansion borosilicate glass, such as one having the percentage composition by weight viz: $SiO_2$ 70.0; $Al_2O_3$, 1.4; CaO, 0.2; $B_2O_3$, 21.7; $K_2O$, 3.2; $Na_2O$, 3.5.

The four glasses thus provide a graded seal between soda-lime and borosilicate glass.

Glasses within the above range possess good melting qualities and good resistance to devitrification.

What I claim as new and desire to secure by Letters Patent of the United States is:

1. Glass compositions comprising the heat-reacted product of the following ingredients by weight in the range of proportions:

|  | Per cent |
|---|---|
| Silica ($SiO_2$) | 55 to 65 |
| Boric oxide ($B_2O_3$) | 9 to 25 |
| Barium oxide (BaO) | 12.5 to 4 |
| Zinc oxide (ZnO) | 7.5 to 2 |
| Calcium fluoride ($CaF_2$) | 5 to 0 |
| Alkali oxide ($Na_2O + K_2O$) | 15 to 5 |

2. Glass compositions comprising the heat-reacted product of the following ingredients by weight in the proportions specified:

| | Per cent |
|---|---|
| Silica ($SiO_2$) | 55.0 |
| Boric oxide ($B_2O_3$) | 9.6 |
| Barium oxide (BaO) | 12.4 |
| Zinc oxide (ZnO) | 7.2 |
| Calcium fluoride ($CaF_2$) | 3.2 |
| Sodium oxide ($Na_2O$) | 3.8 |
| Potassium oxide ($K_2O$) | 8.8 |

3. Glass compositions comprising the heat-reacted product of the following ingredients by weight in the proportions specified:

| | Per cent |
|---|---|
| Silica ($SiO_2$) | 57.3 |
| Boric oxide ($B_2O_3$) | 13.0 |
| Barium oxide (BaO) | 10.4 |
| Zinc oxide (ZnO) | 6.0 |
| Calcium fluoride ($CaF_2$) | 2.7 |
| Sodium oxide ($Na_2O$) | 3.2 |
| Potassium oxide ($K_2O$) | 7.4 |

4. Glass compositions comprising the heat-reacted product of the following ingredients by weight in the proportions specified:

| | Per cent |
|---|---|
| Silica ($SiO_2$) | 59.6 |
| Boric oxide ($B_2O_3$) | 16.4 |
| Barium oxide (BaO) | 8.4 |
| Zinc oxide (ZnO) | 4.8 |
| Calcium fluoride ($CaF_2$) | 2.2 |
| Sodium oxide ($Na_2O$) | 2.6 |
| Potassium oxide ($K_2O$) | 6.0 |

5. Glass compositions comprising the heat-reacted product of the following ingredients by weight in the proportions specified:

| | Per cent |
|---|---|
| Silica ($SiO_2$) | 61.9 |
| Boric oxide ($B_2O_3$) | 19.8 |
| Barium oxide (BaO) | 6.4 |
| Zinc oxide (ZnO) | 3.6 |
| Calcium fluoride ($CaF_2$) | 1.7 |
| Sodium oxide ($Na_2O$) | 2.0 |
| Potassium oxide ($K_2O$) | 4.6 |

JOHN E. STANWORTH.